US007437755B2

(12) United States Patent
Farino et al.

(10) Patent No.: US 7,437,755 B2
(45) Date of Patent: Oct. 14, 2008

(54) UNIFIED NETWORK AND PHYSICAL PREMISES ACCESS CONTROL SERVER

(75) Inventors: Mark William Farino, Menlo Park, CA (US); Mark Anthony Kolar, Highlands Ranch, CO (US); David Christopher Twinam, Littleton, CO (US); Robert Pryor Beliles, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 11/260,532

(22) Filed: Oct. 26, 2005

(65) Prior Publication Data

US 2007/0094716 A1    Apr. 26, 2007

(51) Int. Cl.
*G06F 21/06* (2006.01)
(52) U.S. Cl. .............................. 726/5; 726/12
(58) Field of Classification Search ............ 726/5, 726/2, 12
See application file for complete search history.

(56) References Cited

U.S. PATENT DOCUMENTS

| 5,987,611 | A * | 11/1999 | Freund ............................ 726/4 |
| 2003/0005326 | A1 * | 1/2003 | Flemming ................... 713/201 |
| 2003/0023874 | A1 * | 1/2003 | Prokupets et al. ........... 713/201 |

OTHER PUBLICATIONS

Michael Arata, "One System, Indivisible", Security Management Online (http://www.securitymanagement.com), Jan. 2002, 5 pages.

* cited by examiner

*Primary Examiner*—Gilberto Barron, Jr.
*Assistant Examiner*—Samson B Lemma
(74) *Attorney, Agent, or Firm*—Trellis Intellectual Property Law Group, PC

(57) ABSTRACT

The present invention provides an access control server that holds information pertaining to both network access and facility access. The access control server enforces policies based on location, type of resource, time of day, duration, or other events, and logs all successful and unsuccessful attempts to access a given resource whether it be on the network or at the facility. The access control server operates off a common list or table of attributes and policies, or separate lists or tables of attributes and policies that are arbitrated by a credential verification and policy engine. This unified access control server implements protocols that work with network and/or physical premises-based devices. The unified access control server allows events in the facility to be associated with events on the network and vice versa and direct policies that may be executed in the physical or network realm.

20 Claims, 10 Drawing Sheets

UNIFIED NETWORK AND PHYSICAL PREMISES ACCESS CONTROL SERVER

BACKGROUND OF THE INVENTION

The present invention relates in general to access control for both physical and network based security. More specifically, the present invention relates to a unified apparatus and method for providing physical access control and/or network access control to resources such as buildings, homes, physical infrastructure or information and network systems; where legacy physical security devices and/or network-enabled devices are involved in the access control system.

Security efforts are intended to safeguard people, physical assets (such as physical and intellectual property, and facilities) and information assets. To achieve this objective, a security plan/group typically provides for: controlling access to assets (physical as well as electronic/computerized), monitoring of events and alarms and real-time surveillance at designated locations based on a set of pre-conditions (e.g. policies). In many businesses, organizations or public areas, these security programs have been divided into two parts. One security group and associated system is intended to control access to the physical facilities or resources, and to safeguard authorized and unauthorized visitors. Another security group and associated system is intended to control access for the information systems and network to protect electronic information assets and other network attached devices. Both of these security groups and associated systems manage security risks by controlling access by specified individuals based upon a specific set of criteria, such as time of day.

The type, location, and communications protocols used between components of the physical access control system can vary somewhat; however, in general, the processing of a given physical access control event, and system functionality is the same for all. In a typical physical security (access controlled) environment, the physical security system includes: entry lock mechanisms, entry open/close or other sensors (such as video surveillance cameras), credentials (some form of electronic or physical identification of a device or individual), credential identification input device (e.g. badge reader, Personal Identification Number keypads, biometrics), communication and connectivity devices (e.g. door control panels), credential verification and policy-based access control device (e.g. access control panel), credential and policy creation station (e.g. physical security server), physical security management station (e.g. monitoring, event logging and alarm reporting platform) and facility user list/database (i.e. human resource personnel database).

Physical access control is implemented at ingress and occasionally at egress points of a facility as well as to certain parts or rooms of a facility using various access control devices (ACDs), such as badge readers, electronic locks, and various other door elements. These ACDs actively or passively challenge all users from freely entering, exiting, or accessing a given resource without presenting proper and valid credentials.

Physical access control system credentials may be a plastic card encoded with identifying information, a secret code or password entered at a keypad or other biometric information such as, a fingerprint, or an image of a retina scan. Many organizations provide personnel with credentials in the form of an organization ID or electronic key card with unique information encoded in the form of an electronic identifier or Personal Identification Number. Once the credentials are submitted/read by a badge reader, keypad, etc., the credentials are verified against a list of valid credential holders and its associated policies. These policies may provide other specific requirements for accessing the resource based on time of day, presence of other individuals, etc. or simply send instructions to grant or deny access.

It is common for ACDs (badge readers, biometric readers, electro-mechanical locks, door open/closed sensors (or other contact closures) for a given entrance to be connected by a serial Wiegand connection, a serial RS485 connection, or simple copper cabled contact closures to and aggregated by a door control panel (DCP). The DCP is typically in close proximity to the given entrance or resource under access control. These devices typically communicate via a simple signaling protocol. In many cases, the signaling protocols may be specific to a single vendor's access control products.

The DCP typically connects to multiple and various ACDs. The use of a DCP eliminates the need for each access control device to have its own credential verification and enforcement list or its own dedicated connection to the verification and enforcement device. Some DCPs may have a full or partial credential list; however, this implementation does carry some drawbacks. Given most facilities may have multiple ingress/egress points or require access control of specific rooms or resources within in the facility, it may require additional work to ensure that all DCPs have up to date information. In some cases, it may be necessary to locate certain access control devices outside the secure interior of the facility. Thus, DCPs with credential lists may susceptible to tampering or can be compromised, leading to a security breach, (i.e. the list could be accessed thereby exposing passwords and credentials). Hence, many access control systems offer further centralization of the access control list and associated policies. As such, some DCPs will merely aggregate ACD connections and pass the credential information on to another device for centralized credential verification and policy enforcement, at the Access Control Panel (ACP).

The ACP uses the credential information supplied by the reader(s) connected to a DCP to make a decision whether to grant the bearer ingress or egress rights or to deny the access request. The ACP relies on a physical security server and management station to create the actual list and policies associated with a given set of credentials.

The connection and communication between the ACP and the physical security server can vary, but they are typically based on a serial or modem connection. In some installations, the ACP may use an Ethernet (frame-based) connection to the physical security server but it should be noted those physical access control systems use the Ethernet network for connectivity only. The actual communications between physical access control components is typically proprietary to a single vendor, e.g. the signaling is tunneled in the Ethernet connectivity and communications. Thus, other network resources (other traditional network servers) do not typically communicate with the ACP and are not capable of controlling the ACP. Additionally, security of information systems (e.g. see InfoSec at http://www.cordis.lu/infosec/home.html) concerns regarding unauthorized access or intrusion attacks of a network based ACP are completely unaddressed by nearly every network based ACP provider.

The physical security server ensures that all ACPs have accurate credential and policy information. The physical security server implements a security application for enrolling new credentials, removing expired credentials from the system (to prevent future physical access and defining physical access control policy for each credential at a facility). The physical security server holds the master table of credentials (such as user names, user badge number and other user specific attributes available such as, finger print, retina scan, voice print or other biometric information) and all physical access control policies for all the ACPs under its management. In other words, the server also maintains rules associated with each user to determine when access to a specific portal in an organization is authorized. It updates each ACP to ensure that the correct credentials lists and policies are in place. Thus, rules can be implemented that authorize a user to enter an organization's parking lot, front door, lab door, elevator, supply cabinet, computer network or other areas where the organization desires to control and monitor access. These rules can also be specific for time of day, for certain days of the week, or for a given duration of time. Physical security server also interfaces to a management station.

Physical security servers may be connected via a frame (e.g. Ethernet)/packet (e.g. Internet Protocol)—based network and communicate with other network attached servers, such as a human resource database server; however, they do not provide support functionality for managing network access control or other network security capabilities and furthermore, are not aware of network access events.

The management station provides alarm monitoring and general physical access control administration by physical security personnel. Additionally, it often supports a set of applications for printing and encoding credentials. The management station may be located at a remote site or distributed at several different facilities.

The list of users that are assigned valid credentials and associated policies can come from many sources. In larger organizations or businesses, this potential list may be obtained from the regularly updated employee/human resource database which may be supported via software applications programs from companies such as SAP, PeopleSoft and Oracle. The physical security systems administrator supplies the card, card credentials and associated access rights for a given user.

FIG. 1 illustrates a typical prior art facility access control system 100. Each facility or each floor of a facility will have co-located components 101 that may include several access control devices (ACD) 110 such as electro-mechanical door locks 111, readers 112, door contacts 113, keypads, 114, door alarms 115, motion sensors 116 located at each door or other portal. Additional types of access control devices may include fingerprint sensors, cameras, or other devices, components or software driven identification equipment.

At each door to the facility one or more ACDs 110) are coupled to a dedicated DCP. DCPs may be directly connected to ACP 120 in a star configuration (e.g. DCPs 118 and 119) or coupled in turn to other DCPs which are connected to ACP 120, such as illustrated by DCP 117 and 118. DCPs are typically linked to ACD 120 via RS485 serial cabling. DCPs 117-119 control the operation of ACDs 110 in response to control information provided by ACP 120.

Each ACP 120 controls several DCPs 117-119. For example, ACP 120 may control all the door control panels in a facility, on a particular floor of a multi-floor building or in a particular area of a facility. In most security systems, a serial or an Ethernet link couples ACP 120 to a physical security server 121. The physical security server 121 as well as a physical security management station 122 may be remotely located from the ACPs and centralized within a building or located in a different building.

When a physical access control request event occurs, such as when a person approaches a door, one or more of the ACDs 111-116 generates an input signal to the system. For example, a reader 112 may detect an encoded user ID and transmit the credentials to DCP 117, which performs local message buffering and ACD connectivity aggregation for the door. DCP 117 relays the ACD generated information, in the form of an access request message to the ACP 120. ACP 120 verifies the credentials by comparing the detected credentials against the valid (authorized) credentials list and associated policies to determine if the credential is valid and if a physical access policy is associated with the credential for this ingress/egress point. The valid credential information list and associated access policy are supplied by the physical security server 121 and is transmitted to the ACP prior to the access control event.

If the policy indicates that the door should be opened, an access control response message is transmitted from the ACP 120 to the DCP 117 to instruct it to activate (open) the electromechanical lock 111 for that specific door. If the policy is to deny access because the credentials are invalid, an alarm, for example, could be triggered or sent to management station 122 and the door remains locked.

A different and separate system controls access to information systems and the proprietary network operated by most organizations or other entities. This access control system strives to protect network-based information assets and control access to other network attached devices. A network access control system typically includes but is not limited to: a number of network edge-attached devices (e.g. computers, servers, IP phones, etc.), electronic-credentials (e.g. user or device name, network address, passwords, etc.), frame/packet-based network infrastructure devices (e.g. routers, switches, load-balancers, firewalls), electronic-credential verification and policy-based access control device (e.g. network access control servers), credential and policy creation station and appliances (e.g. network security servers), network user list/database (i.e., human resource personnel database) and network management workstations.

All network devices are commonly connected via wired/fiber optic or wireless media that communicate using frame/packet-based network protocols such as Ethernet and IP. The ability of network devices to communicate with one another does not necessarily imply that one network device can control another network device. The ability to control a device is a function of higher level applications and protocols (such as provided by the OSI 7 layer network communications model).

It should be well understood that network-attached devices, such as personal computers, servers, personal digital assistants, as well as IP phones, IP video surveillance cameras, etc. have wired/fiber optic or wireless communications functionality and are common network-attached edge devices. Many of these devices may offer keyboards, or other input devices that may be used to enter and submit credential information along with embedded circuitry that can provide and request network address information that forms the basis for electronic-credentials.

Network access credentials are used to grant/deny network access and access to various resources attached to the network. Typically, network access credential information is passed from the network edge device to a network access control server via intermediary devices, such as network infrastructure devices (routers and switches). Credentials used for network access control can vary with one of the simplest forms being the combination of a user's name and a password. The password may be used for multiple log-on (network access request) sessions or could be created for a single log-on access event. Credentials may also be a predefined network address (e.g. Ethernet MAC address, or IP address) of the network device that is attempting to connect to the network.

Network infrastructure devices (NIDs), such as routers and switches, provide connections from network edge attached devices to other network attached resources. Routers and switches commonly support and communicate via frame- and/or packet-based network protocols, which encapsulate information that is to be communicated to various other network-attached devices. NIDs may provide network connectivity to network-connectable physical security access control system components for the purpose of communication between the physical security access control system components; however, prior art NIDs are not able to control these physical security access system components for the purpose of physical access of a given resource.

It is very common for network access to be controlled by a log-in system that is designed to limit network access to authorized users and devices. These log-in systems are referred to as AAA servers (Authentication, Authorization and Accounting servers). AAA provides a modular way of performing authentication, authorization, and accounting services for verifying the identity of, granting access to, and tracking the actions of users who require access to the network and network devices.

Authentication provides the method for identifying users attempting to access the network (i.e., be able to tell that a given user is who he says he is). This is commonly performed with traditional username/passwords, and recently through more modern and secure methods such as challenge and response (like CHAP), one-time passwords (OTPs, and PKI certificates). Authorization provides the method for controlling which services or devices the authenticated user has access to (i.e. determine the scope of what a given user can do once he is logged on). Accounting provides the method for keeping track of users' behavior in the network and being able to tell what a specific individual is doing once logged on. The collected information can be used for billing, auditing, and reporting purposes. The concept of network user access control can also be extended to the administrative access to network devices and network management solutions for configuration and monitoring.

One such log-in system is the Cisco Secure ACS, a policy based network access control server. The network access control server maintains a network access centric table or list of valid electronic-credentials and an associated list of network resources a given credential holder/user can access based on certain conditions (e.g. policies). It is used to determine authorized network access levels for users or computers attempting to gain network access. This server's table can hold user names, user IDs, network passwords and rules associated with each user or device that may require access the network. These rules may be referred to as network access control policies (a list of valid electronic-credentials and an associated list of network resources a given credential holder/ user can access based on certain conditions). The network access control server provides the user interfaces for logging on to the network and is also used to configure and provision the network access control system. The ACS server maintains a common log of events so security personnel can monitor, correlate and verify user activity on the corporate network with facility access.

The ACS server and its functions may be deployed in one location or distributed among more than one access control server. The ACS server may either hold all or a portion of the policies, rules and authorized users in a centralized or distributed fashion. The ACS server may hold information regarding unauthorized users so that security personnel can identify perpetrators who attempt to circumvent either facility or network security.

The list of users that are assigned valid credentials and associated policies for network access can come from many sources. In larger organizations or businesses, this potential list may be obtained from the regularly updated employee/ human resource database (i.e. SAP, Peoplesoft, Oracle). The network access control server will occasionally synchronize its list of valid users with the human resources or other organization databases, but all policies are created, maintained and updated on the network access control server directly.

Network access control servers, such as the Cisco ACS server, are typically interoperable with many vendors' traditional frame/packet-based network equipment. It is common for an access control server to periodically send SNMP polls out to each IP-enabled device to verify the health and network connectivity. SNMP polling is well known in the networking art. Nonetheless, prior art network access control servers do not have the ability to support physical access control devices, nor do they interoperate with physical security servers or physical security management stations, door control panels, or provide ACP functionality. Furthermore, prior art network access servers are not aware of physical/facility access events.

Network security servers provide a range of functions generally associated with system configuration and administration. These servers often provide back-end billing and accounting, event logging and user interface communications. The network security servers often communicate with the network access control servers that are providing real-time network access control services. Prior art network security servers do not support physical security access control functions and furthermore, are not aware of physical access security events.

It should be understood that other network security functions may be a part of the network infrastructure. These functions and services include: firewall services, VPN encrypt/ decryption, network Intrusion Detection Services but they generally rely on a network access control server for initial log-on authentication and authorization for network access. In some cases, these services may be integrated into network infrastructure devices. Additionally, a NID may act as a proxy or provide some AAA capabilities.

Network management workstations provide alarm monitoring and general network operation administration by network management and operation personnel. Network management workstations may be located at a remote site or distributed at several different facilities.

FIG. 2 illustrates a typical prior art network access control system. A network is not bound by physical location. A network may include several network-edge devices (NED) 150 such as computers 151, network phone (e.g. IP phone) 152, network camera 153, network connected I/O device (e.g. point of sale terminal, manufacturing process control sensors and machinery, etc.) 154 located virtually anywhere where network connectivity is available.

NEDs 150 are generally directly connected to network infrastructure devices 155 (NIDs). NIDs 155 are commonly routers, switches and/or wireless access points. NIDs 155 provide NEDs 150 with access to various other network resources 156 which are ultimately a collection of other NEDs, or application server computers, or other network connected communications devices (i.e. IP phones, video cameras, etc.) and can include Internet access. There may be a number of interconnected NIDs situated between various NEDs 150 or other network resources 156. The NIDs 155 are directly or indirectly connected via other NIDs to Network Access Control Servers (NACS) 157, Network Management Workstation 158 or Network Security Server 159. The network devices 157-159 may be remotely located from the NEDs 150 and/or placed in a centralized location such as a network operations center or datacenter.

When a network access control request event occurs, such as when a person wishes to connect his computer to the network in FIG. 2, the computer must generate a network access (log-on) request. For example, computer 151 will bring up a small screen requesting the user enter his name and pre-assigned password via the computer's keyboard. These electronic credentials (user name and password) are sent to the network infrastructure device 155 that passes the electronic-credential information on to network access control server157.

Network access control server 157 validates the user credentials by comparing them against the valid network credentials list. It also checks for the associated network access policies to determine if the credential holder complies with all applicable policies for the user to access the requested network resources 156 or other network resources. The network access control list and associated policies are stored on the server prior to the network access control event.

Valid usernames were provided by the human resources database, and were stored in the network access control server's list prior to the access event as well. The password for a given username was previously entered into the list via the ACS user configuration interface or via entry from some other network management server. The network resource access policies for a given user were assigned via a network manager based upon organizational policies.

If the user name and password match an entry in a network access list/table, the user is granted network access privileges. This grant is sent to various network infrastructure devices 155 which provide access to other network-attached resources 156 (e.g. servers with various applications, access to the Internet, etc.). The user can now access the requested resource. If the user name and password do not match an entry in the network access list, the user may be offered another chance to enter the information or NID 155 may be instructed to shut off connectivity to network edge device 151 for some period of time before another network access request can be made. Regardless of the validity of the network access request, network access control server 157 logs the request and the outcome. This log may be directly accessed by network management personnel or sent to network management workstation 158. A validated network access request may also be sent from network access control server 157 to network security servers 159.

As mentioned earlier, some physical security systems and some physical security system components have been designed to connect to an Ethernet/IP-based network in order to transport information from one physical security system component to another physical security system component. However, these Ethernet/IP-connected physical security components do not make use of all of the frame/packet network's resources, such as the AAA or network access control server and furthermore, are not aware of network access events.

Legacy physical security device access gateways, such as shown in FIG. 3, block 125, are available that can translate various access control system device vendor's signaling formats and protocols to another access control system vendor's component formats. These gateways provide greater interoperability between disparate physical security vendor system components and may allow physical security information to be transported over a frame/packet based network; however, these gateways do not allow network access control servers to control physical/facility access control devices. An ACP is still required to validate the credentials as previously discussed in the FIG. 1 example.

Also, with some prior art DCPs (as shown in FIG. 4, block 129) and some access control devices (e.g. badge readers, as shown in FIG. 5, block 131) may support frame/packet-based network connections, such as Ethernet. When information is passed to a DCP from its associated ACDs, it aggregates the data and puts the data in the payload portion of a packet or Ethernet frame before transmitting it to an edge router on a local Ethernet network or other wired or wireless packet based network.

Similar to the physical security access gateways, these network-connectable DCPs and ACDs allow physical security information to be transported across the frame/packet-based network but continue to operate under the direction of the physical access control system to validate credentials and impose policy based actions based. on those credentials. Hence, they receive access control list and policy updates from the physical security server or physical access control panels. These network-connectable DCPs and ACDs do not receive updates from network access control/AAA servers and furthermore, the DCPs and/or ACDs are not aware of network access events.

When initially deployed, these prior art network-connected access control gateways, DCPs and ACDs are commonly configured to communicate (broadcast a physical access event) over a single sub-net; thus, the number of devices under management by a single physical access control system is somewhat limited in size. However, a few network-connected physical access control gateways, DCPs and ACDs may be configured with the ACP's or physical access control server's network address or an address of a default network access gateway permitting it to be interconnected via a routed interface. It will be recognized that the default network access gateway is often referred to in the art as a domain name server (DNS). This gateway facilitates a much larger number of physical access control components to be placed under management by a single ACP/physical access policy server.

It has been recognized that the inability to jointly manage and unify the access control programs for both facility and network resources compromises the effectiveness of overall corporate security. Simply using, for example, smart-card technology to unify physical security access control and network access control credentials does little to unify physical access control and network access control systems or tie together physical security access control policies with network access control policies and vice-versa. Thus, even if both facility access systems and network access systems are diligently monitored and managed, organizations remain vulnerable to misuse or negligence by not tying physical security and network security policies together.

From a network security perspective, the inability to tie physical and network access together creates vulnerability, exposing the network system's owner to loss of valuable confidential or proprietary information or damage to the network itself. To illustrate this vulnerability, consider if certain employees forget to log out of the computer when they leave the facility at the end of the day. After they have left, the computer remains connected to the network and may be used by anyone who is present in the facility, even if they are not authorized to access the network. Clearly, it is not desirable to permit an unattended terminal to remain connected to the network after the authorized user has left the facility. If the network access control server had access to a user facility departure log, via "badging-out" or facial recognition video surveillance, the unattended computer's network access could be terminated, thus eliminating the vulnerability.

Simply establishing a policy that provides network access to all authorized users of a facility does not address the preceding vulnerability. Consider that while it is acceptable for the custodial staff, including out-sourced custodial services personnel, to have access to a building for cleaning and maintenance, it may be unacceptable for these same facilities-authorized personnel to have access to network resources and intellectual property.

To illustrate another vulnerability from a physical safety and security perspective, consider the possibility of one or more facility- and network- authorized users who enter a facility by "tailgating" through a door with another authorized user when they are entering a facility as a group (e.g. the tailgater does not present his credentials for validation). When tailgating occurs, facility security is not able to accurately determine who is in a facility at any given time. Thus, if a person that has not officially entered a facility is seen logged into a computer at the facility, corporate security must determine what happened. Further, in the event of an emergency such as a fire or explosion, corporate security and rescue personnel need to know who is in the facility and where they are located so that they can be quickly and safely evacuated. If physical and network security access control is not unified, physical safety and security personnel would have to consult both physical security logs and network access logs to more comprehensively determine who may be in a building.

Many network security breaches and thefts of intellectual property occur from remote locations. Despite the ability for network operators to limit access to certain network resources from certain network connections, many network security breaches occur because so-called computer "hackers" can trick the network access control server and NIDs into believing the hacker or user is connected to an "authorized" network connection. If the network access policies could be linked to the physical access server control logs, this would provide cross-validation of a user's physical location in an approved facility or room via the recent presentation of valid physical access credentials. Thus, a stolen or "hacked" password would not be sufficient for network resource access.

Clearly, there is a need for unification of physical security (access control) and network access systems that facilitates new security policies and improves both physical and network security. To overcome the disadvantages of the prior art physical and network security systems, the present invention discloses a unified access control system and method, the features and advantages of which will become apparent from the detailed description and review of the associated drawing figures that follow.

DETAILED DESCRIPTION OF EMBODIMENTS OF THE INVENTION

In the description herein for embodiments of the present invention, numerous specific details are provided, such as examples of components and/or methods, to, provide a thorough understanding of embodiments of the present invention. One skilled in the relevant art will recognize, however, that an embodiment of the invention can be practiced without one or more of the specific details, or with other apparatus, systems, assemblies, methods, components, parts, and/or the like. In other instances, well-known structures, materials, or operations are not specifically shown or described in detail to avoid obscuring aspects of embodiments of the present invention.

Figure 1:
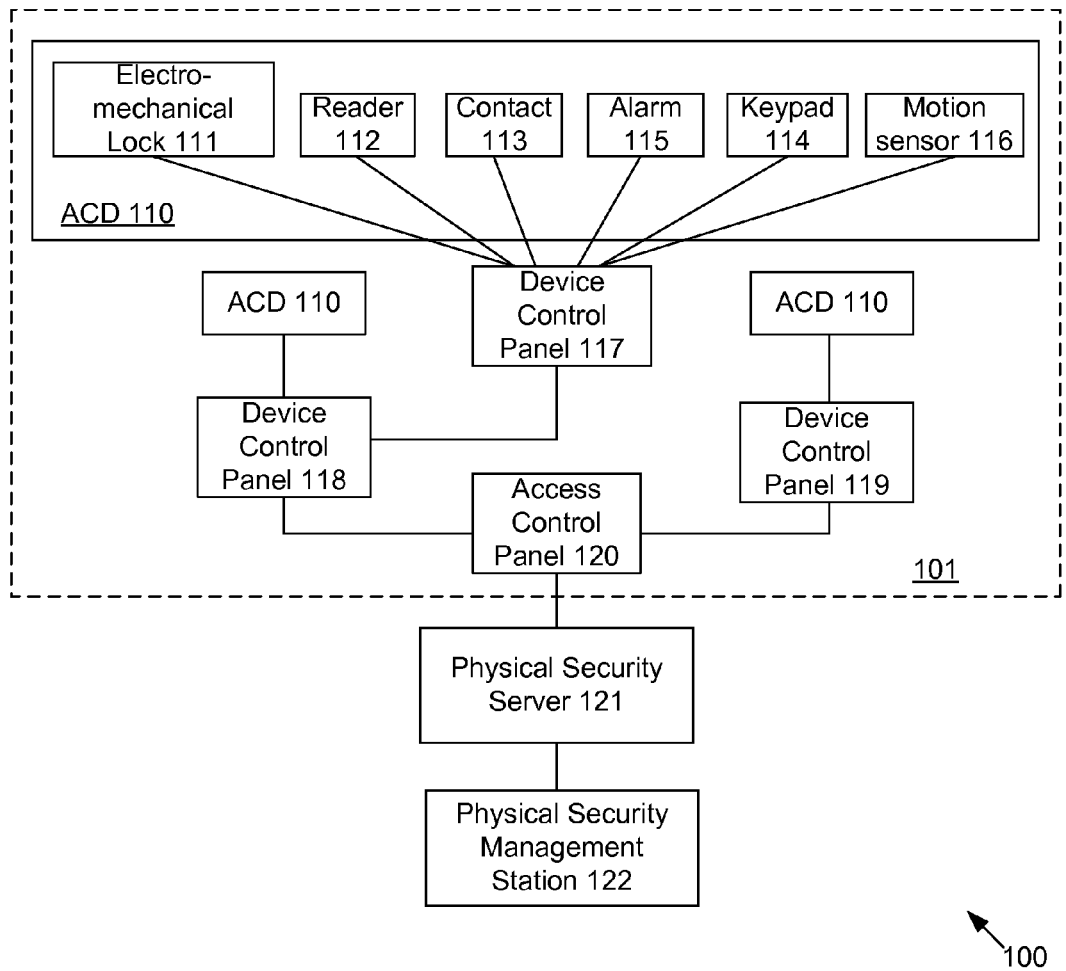
FIG. 1 illustrates a typical prior art facility access control system.
Figure 2:
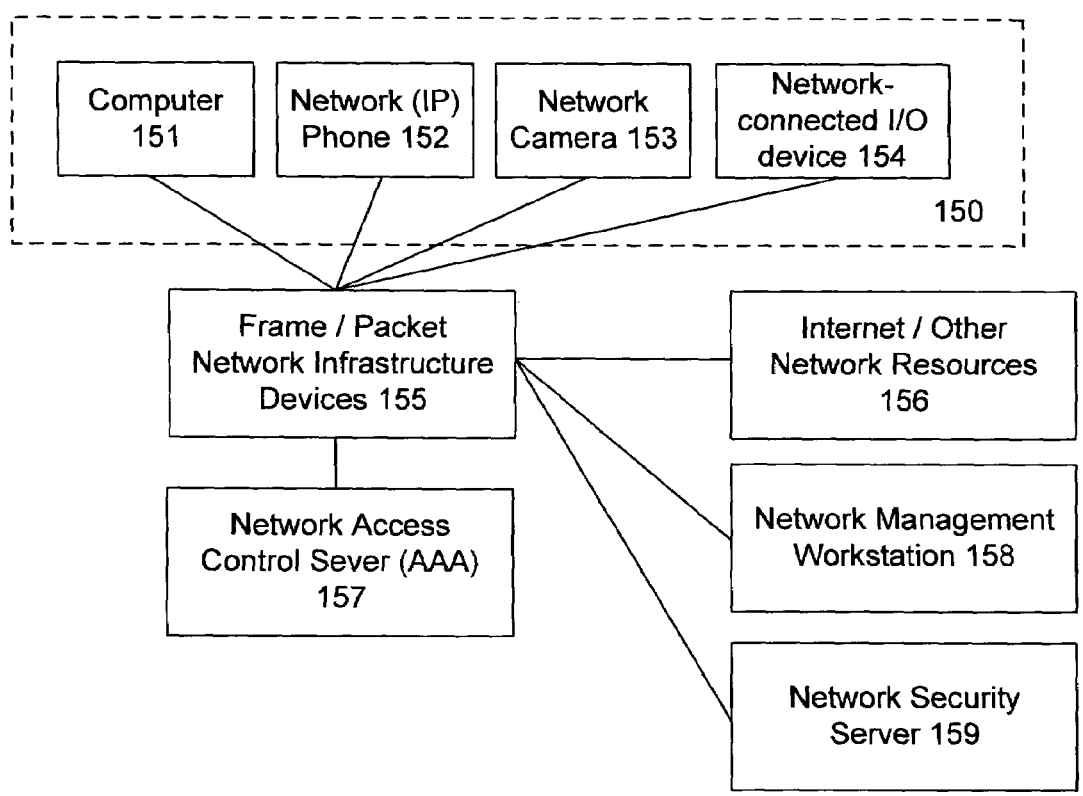
FIG. 2 illustrates a typical prior art network access control system for a frame/packet-based network.
Figure 3:
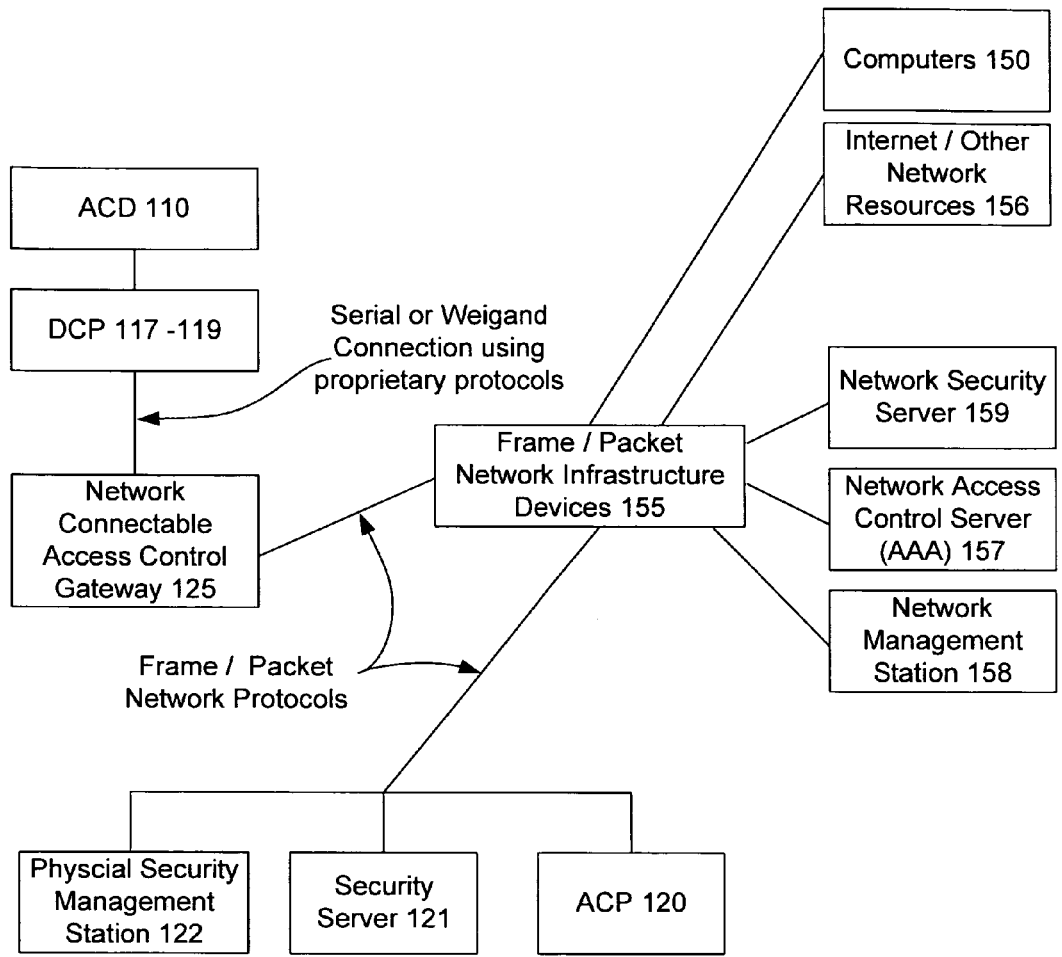
FIG. 3 illustrates the use of prior art network-connectable physical security access control gateway as part of a physical security access control system.
Figure 4:
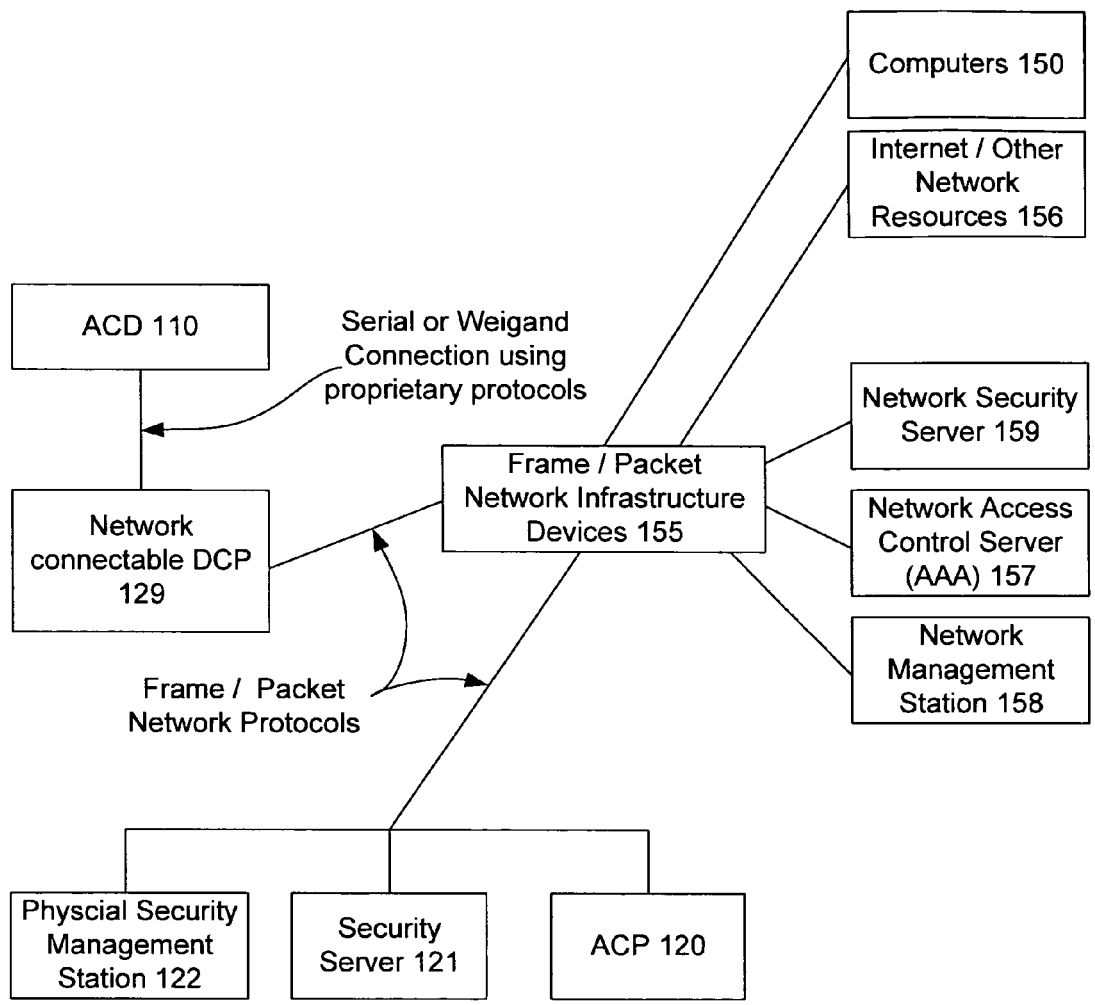
FIG. 4 illustrates the use of prior art network-connectable physical security door control panel as part of a physical security access control system.
Figure 5:
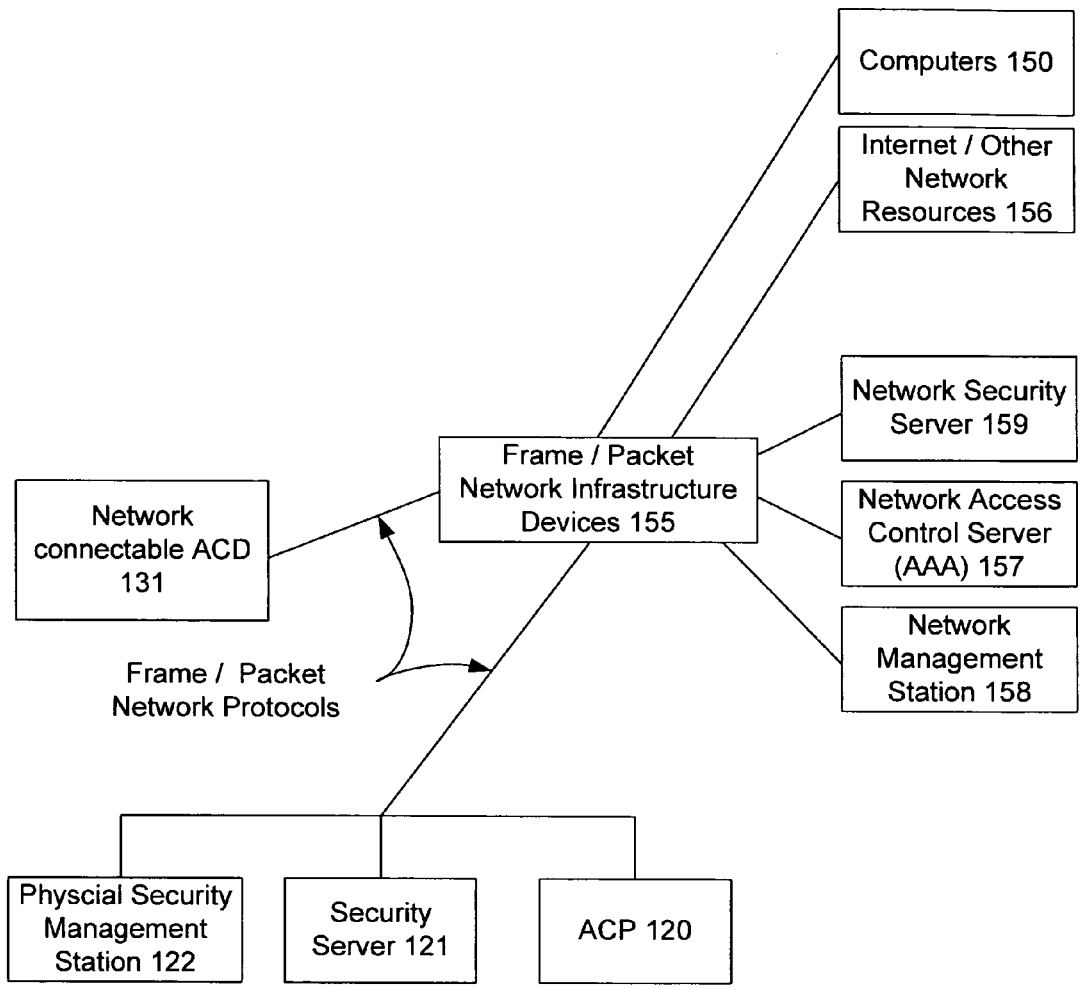
FIG. 5 illustrates the use of prior art network-connectable physical security access control device as part of a physical security access control system.
Figure 6:
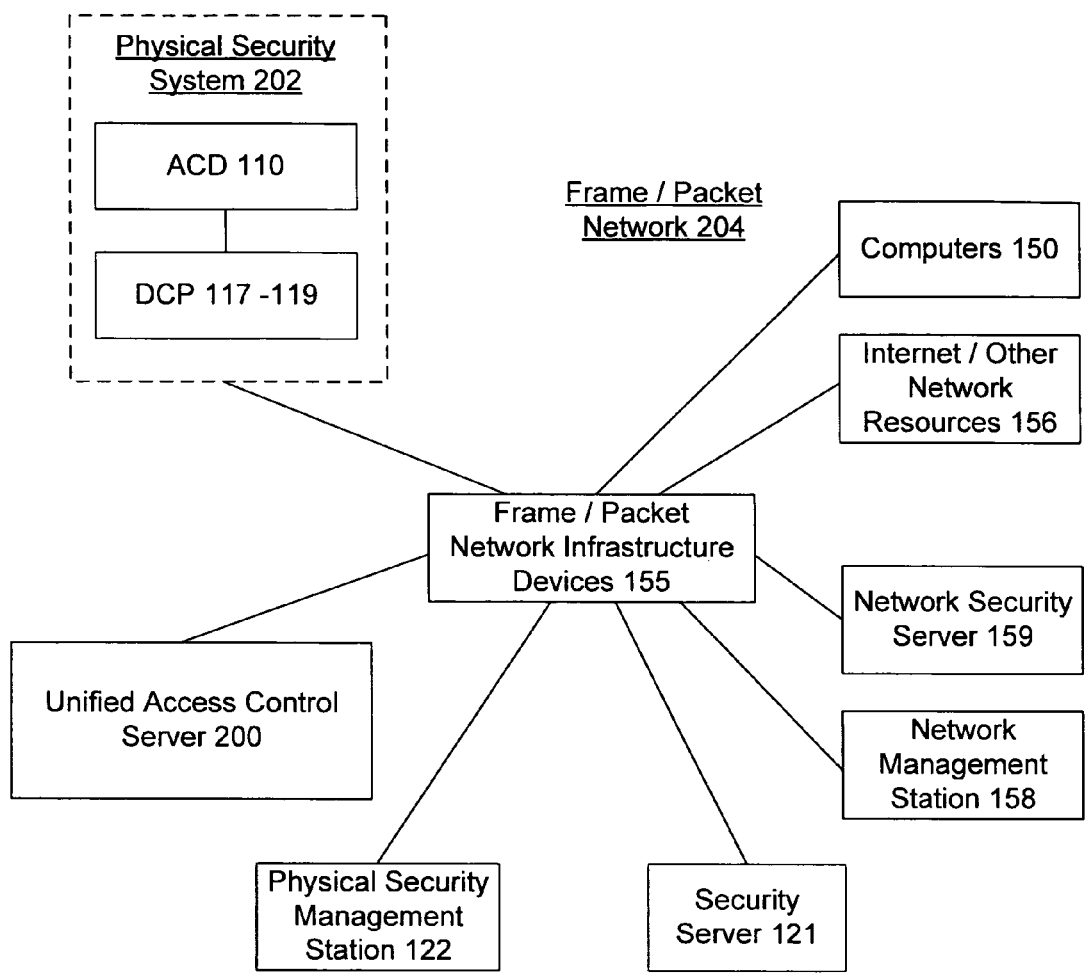
FIG. 6 illustrates a unified facility access control and network access control system in accordance with one embodiment of the present invention.

FIG. 6 illustrates one embodiment of the present invention where a unified access control server 200 for network and physical premises access is shown. Server 200 interfaces with both the legacy physical security system 202 and the frame/packet network 204 to control a unified physical access and/or network access. This system may be adapted to monitor and control access to buildings, homes, physical infrastructure as well as to information and network systems. Advantageously, server 200 unifies credential verification and associated policies and policy enforcement for physical facilities and network-enabled devices. This unification facilitates implementation of new security policies that strengthens both physical and network security. These policies eliminate security holes in both the physical access control and network access control systems and ensure that both the facility access system and the network access system are diligently monitored and managed. Thus, organizational security is improved by minimizing vulnerability to misuse or negligence.

The unified access control server 200 eliminates the need for an Access Control Panel and a network access control server while maintaining the valid credential list and access policies in a table previously supported by these devices. Server 200 also enforces all access policies. Further, the unified access control server 200 allows for physical access events and network access events to be monitored, correlated and tied together to strengthen both physical and network access control policies.

Figure 7A:
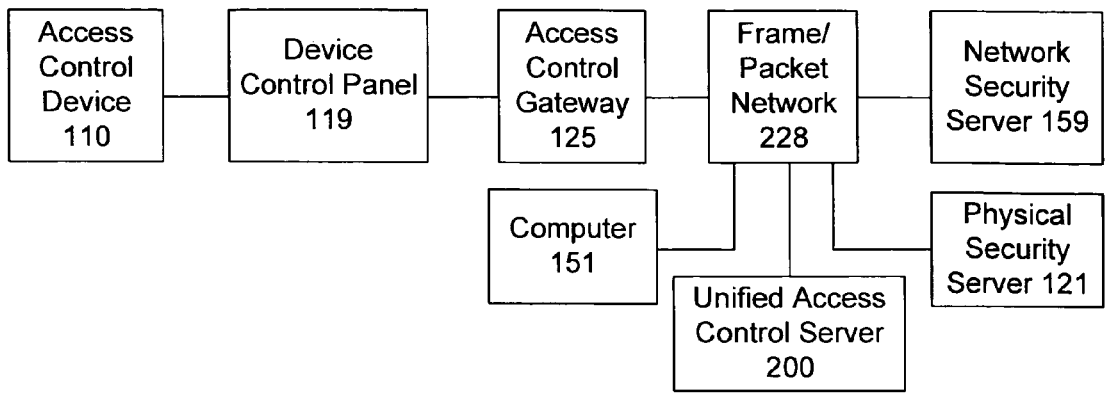
FIGS. 7A-7C are block diagrams illustrating various embodiments of the present invention.

Refer now to FIG. 7A where one embodiment of the present invention is illustrated. In accordance with the invention, an access control system is used to control and/or monitor the facility and its physical and network resources. The present invention assumes that one or more access control devices (ACD) 110 and computers 151 or other network edge devices are part of a facility and its network, respectively. Common access control devices include card readers, biometric sensors, cameras, alarms, motion sensors and electro-mechanical door locks. Each ACD 110 is coupled to door control panel (DCP) 119 that, in turn, is coupled to a packet/frame-enabled access control gateway 125. Access control gateway 125 allows legacy ACDs and DCPs that were previously deployed in and around the facility to be used with the present invention without further modification to the physical access control system. Access control gateway 125 simply enables legacy DCP communications to be transmitted over frame-or packet-based networks 155. The DCP access request messages are received and responded to by the unified access control server 200.

In general, unified access control server 200 validates credentials and enforces access policies based on location, type of resource, time of day, duration, or other events, and logs all successful and unsuccessful attempts to access a given resource whether it be on the network or at a physical premises. Computer 151, and/or other network infrastructure devices and/or DCP 119 are responsible for implementing the unified access control server's returned instructions (at a facility, for example, by either setting off the alarm or opening the door.)

Unified access control server 200 also supports access control monitoring functions and access control events. Using real-time information, security personnel can simultaneously monitor and manage access to physical and networked resources to more comprehensively protect the people working in the facilities and information assets.

Note that unified access control server 200 also communicates with both network security server 159 and physical security server 121 over a frame-/packet-based network 28 such as, an Ethernet network or the Internet. Network security server 159 controls the enrollment of new devices when they are added to the network and manages new and expired user credentials. When a revision to a network access policy is made, the revised policy is transferred from network security servers 159 to the unified access control server 200 and mirrored servers, if any. Similarly, when user credentials are updated, this information is propagated to the unified access control server 200. From a physical security access control system perspective, physical security server 121 controls enrollment of new physical system users when added as well as continuing to manage new and expired user credentials. When a revision to physical access control policy is made, the revised policy is transferred from the physical security server 121 to the unified access control server 200. Hence, the unified access control server 200 provides all functionality formerly associated with the network access control server as well as validating physical access control credentials and enforcing valid associated physical access control policies, formerly provided by an access control panel.

An access control event can be a user or computer requesting network access or a user requesting access to a facility door or to a room such as an office, storeroom or laboratory. By way of example, when unified access control server 200 receives an access request message from a computer 151 or a DCP 119 connected to access control gateway 225 via frame-/packet-based network 228, the unified access control server 200 responds to the request message by verifying the validity of the credential, the location of the requesting device or requestor, and executing a specific policy based on the information provided. The result of executing this access control policy is a corresponding access control response message that is sent back to the computer 151 or the DCP 119 attached to access control gateway 225 via network the frame-/packet-based network 228.

Moreover, the present invention enables new features by allowing new policies to be created and implemented that tie physical access events with network access events. For example, prior to a network log-on event, in order for a given user to access network resources, the unified access control server can enforce a policy that the user must also have received favorable physical access validation in a specified room or building within the past one hour. Additionally, when the employee leaves their office or the facility, network access can be terminated based on a physical facility egress request event generated by a badge reader or video surveillance camera and associated facial recognition capabilities. This ensures that an open network connection is not left unattended after the authorized user departs the facility. Thus, physical and network access events have been tied together, strengthening network access security. Such a policy also reduces the potential for an unauthorized party to gain access to the network from a remote or different location. Additionally, by enabling the process of and making physical access validation a pre-requisite for network access, it enables a new policy that provides a stronger motivation for valid credential holders to cease "tailgating" into a facility.

Providing unified access to both physical and network access logs enhances both physical and network security. For example, if it has been an extended period of time since a user has created a physical access event in a given building, the user's presence may be verified, in part, by reviewing the network access/activity log portion of the unified access control server. This would serve to aid in locating a given user in an emergency situation. As a complementary feature, the present invention enables an update of physical access logs when network access has been established from a specific location even if no physical access event was previously registered.

Additional advantages and benefits provided by the unified access control server (e.g. credential verification and policy enforcement engine using associated table(s) or list(s)) includes the ability to deny network access to contractors, partners, consultants and temporary employees who are authorized to be in a facility but who are not authorized to access the network. Employers often underestimate the ability of outsiders to take advantage of even limited access to important systems. Yet another advantage of the unified access control server with its policy engine and associated table(s) or list(s) addresses the issue of former employees or other perpetrators, who no longer work at an organization but retain access to network-based information resources directly, through back doors, or indirectly through former associates. Anticipating conflict with an employer, or even termination, these perpetrators may prepare back-door access to the network by, creating alternative passwords, or simply stockpiling information on the network infrastructure and its connections for later use. With the unified access control server, network access can be correlated with authorized physical presence in a facility.

From an operational perspective, network and physical security servers 159 and 121, respectively, continue to maintain the access control policies defined by network and physical security administrators as well as information regarding credentials and the identity of all access control requestors respectively. However, in terms of validating credentials and enforcing policies, the unified access control server can require less maintenance time than the aggregate time required to maintain prior art access control panels and a prior art network access control server. Given a single unified access control server 200 functions as both an ACP and network access control server, it collapses the hierarchy of both systems to minimize the cost of installing and maintaining physical and network access control systems.

The present invention affords the efficient maintenance of user/personnel data, a more consistent and extensive set of rules for resource access and enhanced security for both physical access to the facility and network access:

Moreover, in some cases it may be possible for the unified access control server to eliminate the physical access security server and network access security server as well. This elimination would require the unified access control server to implement the additional security server functions and result in further enhancement of the operational savings associated with the unified access control server. Referring once again to FIG. 7A, in a minimized configuration embodiment of the present invention, physical and network security servers 121 and 159, respectively, and unified access control servers 200 may be combined in a single platform or distributed among a plurality of simultaneously active platforms.

Figure 7B:
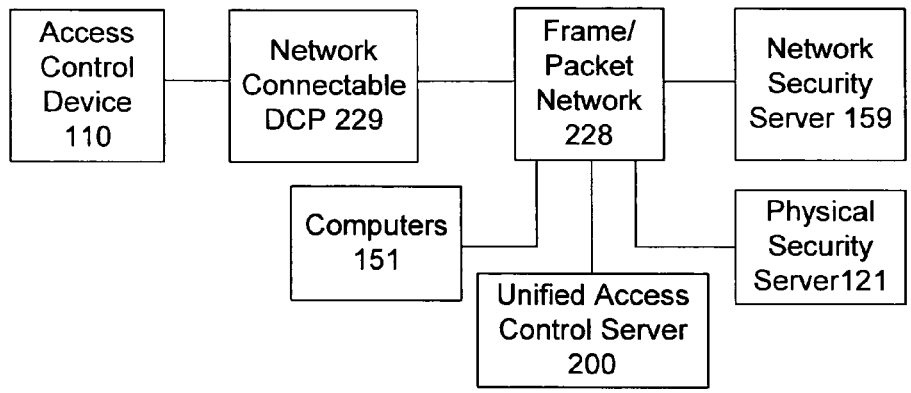

In another embodiment, as shown in the block diagram of FIG. 7B, computer 151 and plurality of ACDs 110 are coupled to a network-connected DCP 229. DCP 229 aggregates data from the ACDs, packetizes the data and forwards packets over frame-/packet-based network 28 to unified access control server 200. Unified access control server 200 will return control information as dictated by the relevant access control policy. Similar to the previous event example discussion in conjunction with FIG. 7A, the present invention supports the same functions in the FIG. 7B embodiment by replacing both the physical access control panel and the network access control server as well as offer the previously discussed additional advantages and benefits associated with the universal access control server 200.

Figure 7C:
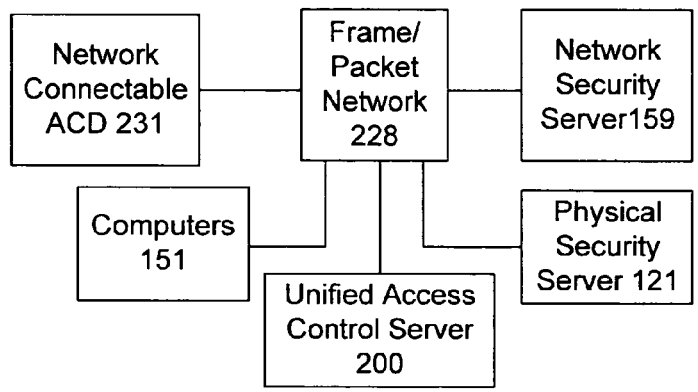

FIG. 7C illustrates yet another embodiment of the present invention. In this case, each ACD 231 is network-connected and communicates with unified access control server 200 over the frame or packet-based network infrastructure network 228. Similar to the event example discussion in conjunction with FIG. 7A, the present invention can support the same functions in conjunction with the FIG. 7C embodiment as well as offer the previously discussed additional advantages and benefits associated with the unified access control server. Note that various combinations of ACDs 110, DCPs 119 and gateways 125, DCPs 229 and ACD 231 may co-exist in one unified system. Further, it should be noted that the unified system may be deployed in one building or may include multiple facilities each of which is configured with network connected ACDs, legacy devices or a combination of network connected ACDs and legacy devices.

In the embodiments shown in FIGS. 7A-7C, a computer device, such as the illustrated computers 151, is also coupled to the frame or packet-based network infrastructure network 228. In a typical application, hundreds or even thousands of computer devices, such as personal computers, IP-enabled telephones or other networked computing devices are coupled to frame or packet-based network infrastructure network 228 and may be located in one or in multiple facilities around the world. Unified access control server 200 functions to control access to network resources by users who are both authorized to be in a facility and who are permitted to use network-connected devices. Unified access control server 200 implements unified access policies for both network and physical resources.

The process of registering network devices with the unified access control server is modified slightly from the manner in which a prior art network access control server would support the process. Recognizing that network-connected physical access control gateways, or network-connected DCPs or ACDs are pre-requisites for use with the unified access control server, these gateways, DCPs and ACDs will be configured and registered with the unified access control server 200 in any known manner. The unified access control server will record the IP and/or MAC address of the gateway, DCP and associated ACDs as these devices are introduced and connected to the network via well known network protocols such as ARP requests, etc. The network-connected ACDs, DCPs and gateways will either be manually-or auto-configured with the address of the unified access control server in the same manner as when communicating with a network-connected ACP/physical security server or will use a default network address gateway (e.g. a DNS server).

It should also be understood that the unified access control server can be deployed in discrete physical access control systems and network access control systems. The unified access control server would simply support the prior art access control panel function or the prior art network access control server function respectively. In the case of deployment of a unified access control server in a legacy physical access control system, network-connected physical access control components as outlined in FIGS. 7A-7C would be pre-requisites in order for the unified access control server to communicate with various physical access control devices.

In other embodiments, other policy-based building management devices that exist in a facility, that use of a common frame-/packet-based network infrastructure, can take advantage of the knowledge of where an employee is present in a facility and activate environmental controls (e.g. heating and cooling policies, lighting policies, and the like) in that area or zone of the facility. Similarly, when the employee leaves the area, environmental controls can be deactivated. These devices may also include additional security and safety devices such as fire and smoke sensors or alarms and dedicated security phones or panic buttons, by way of example, that are deployed throughout each facility. The unified access control server can validate and enforce appropriate policies and responses to these other building management devices.

Advantageously, the unified access control server (credential verification and policy enforcement engine and associated table(s) or list(s)) that maintains user access rights to the computer network can be the same table that is used to determine access rights to the facility and other facility functions (e.g. HVAC, and lighting). This unified access control server minimizes maintenance requirements and operational overhead, among many other advantages. The unified access control server functions as a policy server that allows events in the physical realm to be tied to events or access of network resources and vice versa. The consolidation of policy based devices permits the integration of other aspects of physical security.

Although illustrated as a single device in the preceding examples 7A-7C, it should also be understood the unified access control server 200 may be implemented in a distributed or mirrored functionality nature with one or more servers concurrently active. The access control server functions and associated tables and/or lists may be mirrored at various sites to improve reliability, survivability, or response times. Moreover, the tables and/or lists can be stored in flash memory or other updateable non-volatile memory at each facility in the same manner as access control information is stored in prior art devices. In some embodiments, the mirrored table(s) may comprise a sub-set of the information held in a master table to address privacy and other security concerns.

The unified access control server can also provide "virtualized" functionality allowing a single unified access control server to operate as multiple network access control servers or physical security access control panels. This ability-would be useful for out-sourced physical and network security monitoring and management providers, as is common with home and business security monitoring services. It is common for physical security badges to include additional information on the entity that issued a user's badge, i.e. the organization associated with the user and the badge. Therefore, a virtualized unified access control server can use this additional information to quickly isolate the portion of the access control table and policies that are relevant to that specific organization and the resource under access control, e.g. the table and the server are "virtually" dedicated to one organization while in reality the relevant lists and policies are a subset of the complete unified access control server's table which contains entries for many different organizations.

The unified access control server implements access policy that regulates user access to multiple facilities. Once a user is authorized to be present at a given facility, the unified access control server also regulates access to the facility's network resources. In other words, the unified access control server may implement a common access policy at multiple facilities or it may implement a different access policy at each facility.

A table associated with the unified access control server 200 contains information to support both physical security access control systems and network access control systems. This table includes but not limited to: a full or partial list of authorized users for physical access to a given facility or resource and/or network resource access, user identification numbers, time of day, day of week, network addresses, biometric information, authorization codes and similar information as well as physical access control policy information and network access control policies. Additionally, the table can include new policies that can only be implemented when both physical access events and network access events are jointly monitored/unified.

Figure 8:
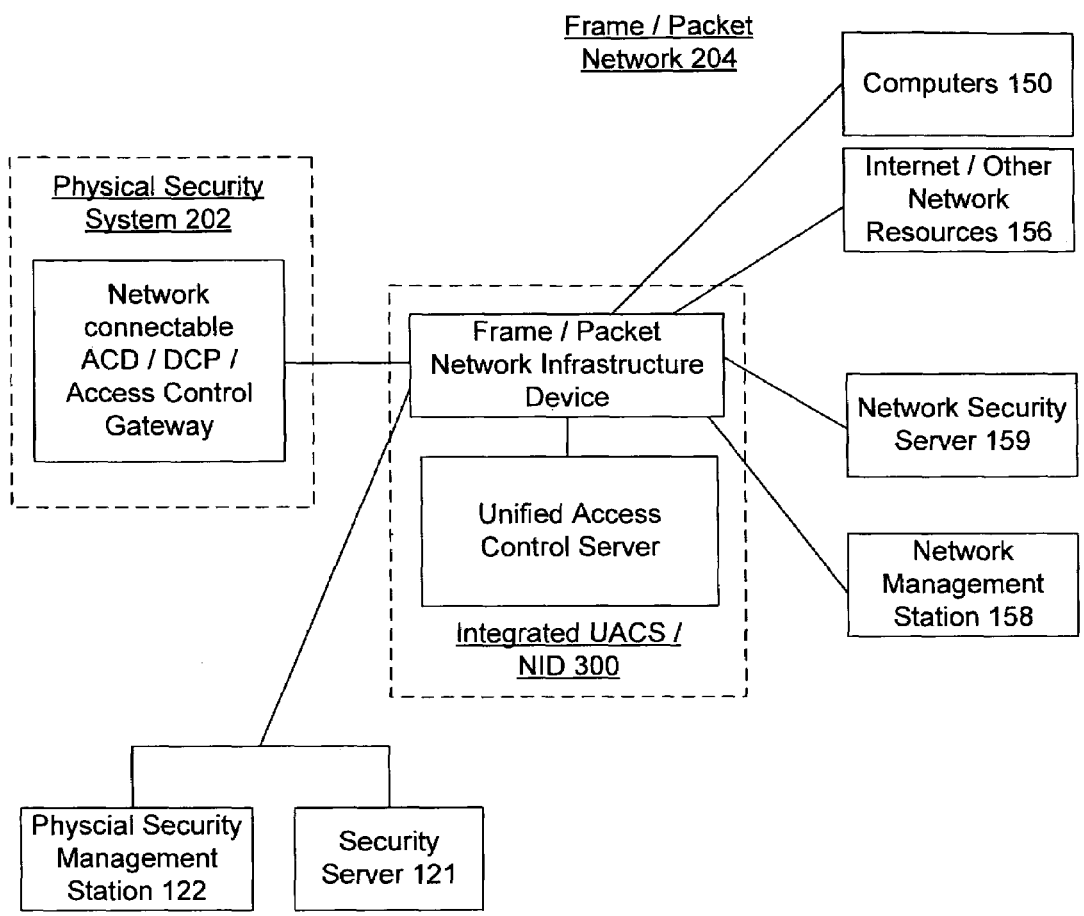
FIG. 8 illustrates the application of a unified access control function as an integrated part of a Network Infrastructure Device in accordance with an embodiment of the present invention.

In another embodiment shown in FIG. 8 the functionality of the unified access control server is integrated and consolidated with one or several network infrastructure devices (i.e. routers, switches, wireless access points) as depicted by block 300. Specifically, the unified access control policies and associated table(s)/list(s) for physical access and network access control is integrated and supported by one or more various network infrastructure devices. By integrating the access control table/list and credential verification and policy enforcement engine in these devices, which are pervasive throughout a network, an additional level of redundancy is added to the access control system without adding additional access control servers. This integration can further consolidate the number of devices required in network access control and physical access control systems. It may also further aid in operational aspects including deployment and on-going maintenance.

The unified access control server's table, credential verification and policy enforcement engine(s) can be functionally implemented in several ways. In one embodiment the physical access control and network access control tables are consolidated into a single table that credential verification and policy enforcement engine(s) access. Another embodiment of the unified access control server may keep the physical access control and network access control tables separate and require the credential verification engine and policy enforcement engine to perform concurrent or consecutive look-ups of two or more access control credential and policy tables. With the look-up results for both or all tables, the engines may use arbitration logic to validate and determine the appropriate physical or network access response.

This arbitration logic may also be used to resolve conflicts between "global" access control policies and "local" access control policies. For example, a global policy may be established to comply with a government directive such as: only authorized users who have a government security clearance can access certain network resources. However, a "local" policy may have been established which allows all users physically located at a certain facility to access these same network resources, regardless of the user. This local policy may have been based on an assumption that all users who are in the facility have the proper security clearance. Hence, the global access policy and local access policy would be in conflict, if a user from another location, who did not have the proper government security clearance visited this said local facility where the "local" access policy was in effect and this visiting user attempted to access the restricted resource. In such a case, the unified access control server arbitration logic would properly deny the access request based on the global policy taking precedence.

The unified access control server or engine can be implemented or can be compatible with certain standards such as: Lightweight Directory Access Protocol (LDCP) and Open Database Connectivity (ODBC); user authentication support; 802.1X authentication, including Extensible Authentication Protocol Transport Layer Security (EAP-TLS), Protected EAP (PEAP), Cisco LEAP, EAP-Flexible Authentication via Secure Tunneling (EAP-FAST), and EAP-Message Digest Algorithm 5 (EAP-MD5). The unified access control server or engine is also responsible for down-loading access control lists for any network access device.

Figure 9:
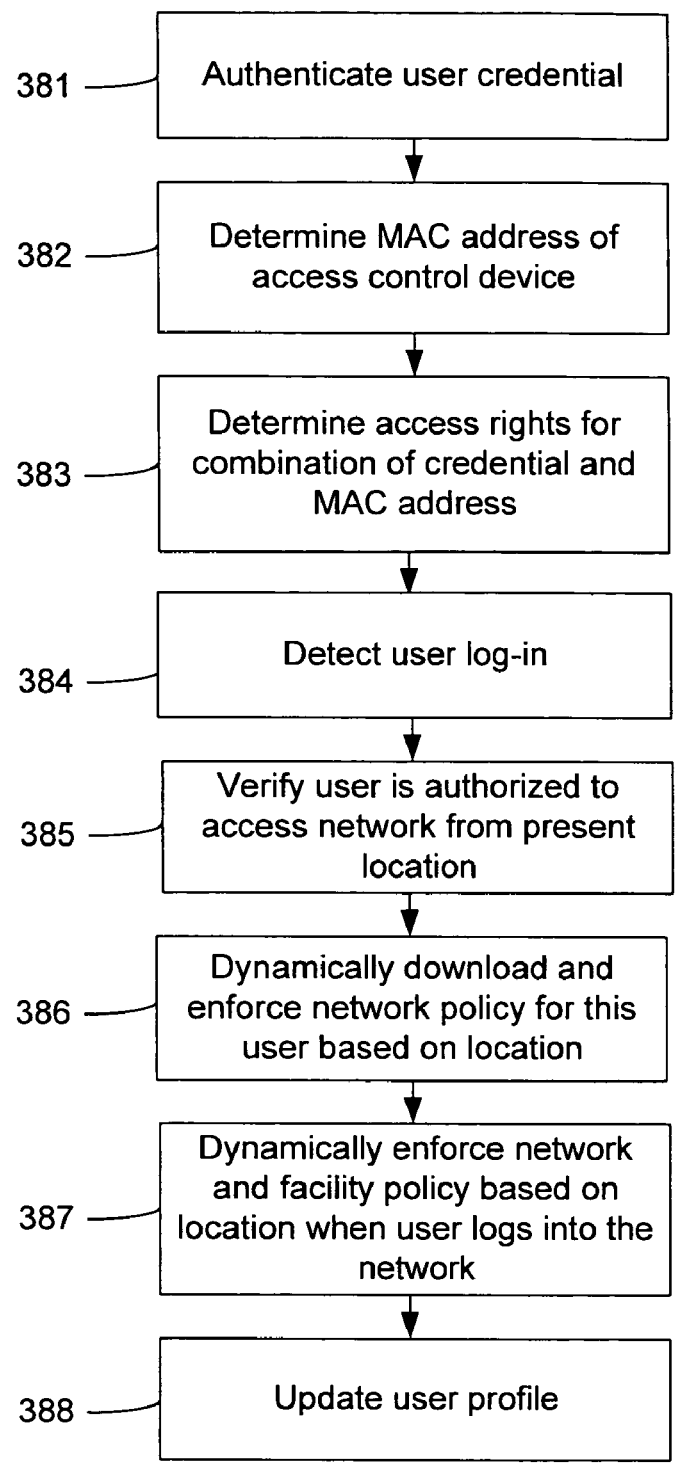
FIG. 9 illustrates operation of a unified network and physical premises access control server in accordance an embodiment of the present invention.

FIG. 9 illustrates the series of events and actions that a unified physical and network access control system would take in order to increase an organization's overall physical and network security posture using the exemplary components in FIG. 6. The following example policy assumes that a physical access control event will precede a network access event (i.e. the user will badge-in to a give facility or location and will then proceed to his work area and log-in to the corporate network).

A user presents credentials at a reader or other ACD. The detected request and associated credential information is transmitted as an access request message in one or more packets to the unified access control server 200. The unified access control server 200 looks up the electronic version of the credential in exemplary table to authenticate (determine if the credentials are valid), as indicated at step 381. The access control device network address is also read and recorded by the unified access control server 200 as indicated at step 382 such that this information can be used in a future network access request event as well as the on-going physical access request event. The unified access control server 200 determines the access policy for the particular combination of the credential and physical location as indicated at step 383, and identified by the recorded ACD network address in step 382. The resulting grant or deny response is then transmitted to the networked access control device; assuming the credentials are valid and that a policy approves access via the corresponding resource ACD device, the user may enter or access the facility.

The user then arrives at computer 151 or other network-attached communications or computing device. For this example, the PC is in relative close proximity or under the physical access control of the ACDs used in steps 381 through 383. The user then wishes to log-on to the network. This log-on request is received by the network infrastructure device 155 and unified access control server 200 (step 384).

Step 385 occurs when the user requests access to the network at given a network port (e.g. a specific port connection on a specific network infrastructure device such as a switch located in the same general physical areas as the physical ACD used in steps 381 through 384). This initial log in request is sent to the unified access control server 200. Server 200 executes the associated access control policy for the computer based on verification of the credentials. More specifically, server 200 verifies that the user is authorized to access the network from the present location. If the user is not authorized to be in a facility or is not authorized to access certain computer resources at a specific facility, access may be denied and an alarm or alert may be issued to security personnel. If the policy is to allow access, the user is granted access to the networked computer resources. Then, server 200 may request the network infrastructure device (such as a switch) to download the network policy for this computer as indicated at step 386. Hence, the present invention enables correlation of events in the physical realm with events occurring on corporate network resources and vice versa.

In some instances, it may be necessary, to transfer a user profile to a different unified access control server supporting and controlling network access and physical access at another facility. User profiles may be transferred, if, for example, the user is visiting a different facility. The present invention implements a unified policy-based network and physical premises access server that operates off a common database of user/personnel attributes. Network security server 159 and physical security server 121 simply update the user's profile so that their personal preferences follow them from site to site within a facility. This feature allows, for example, the configuration update of the VoIP communication system database based on the location of the user and the telephone extension the user will be using while in that location.

Figure 10:
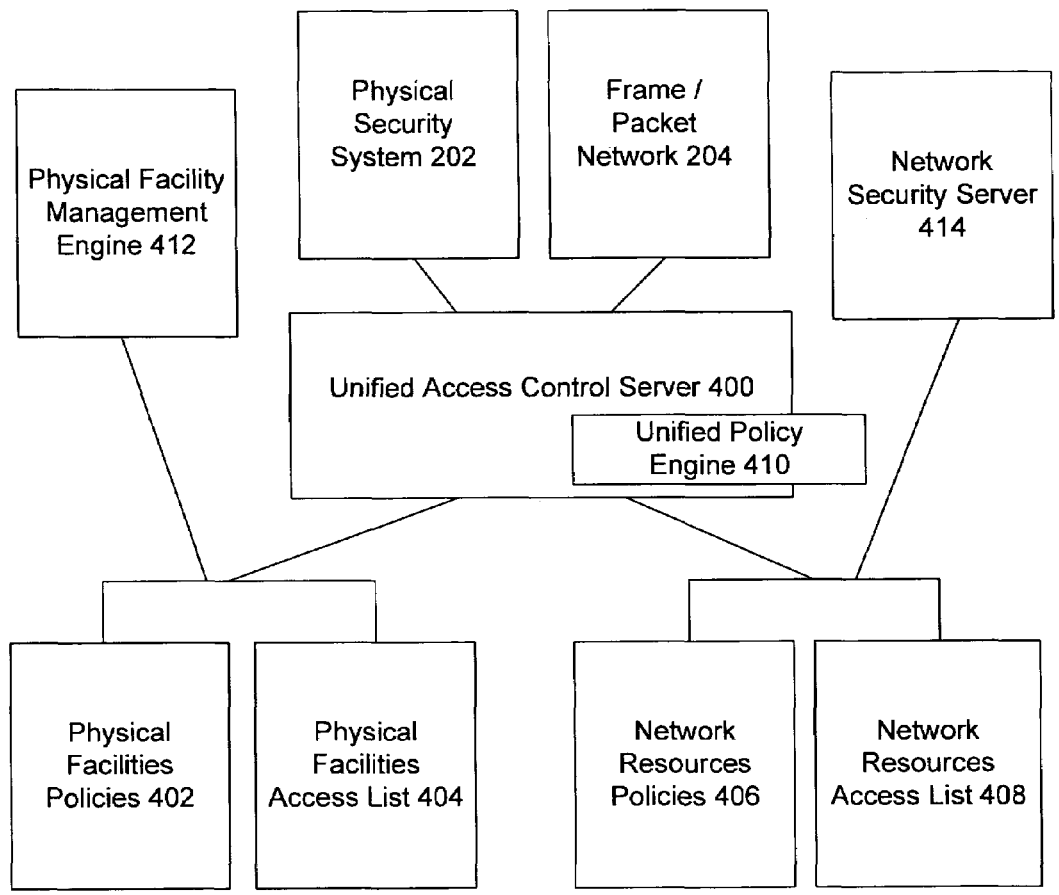
FIG. 10 illustrates an embodiment of unified access control system in accordance another embodiment of the present invention.

FIG. 10 illustrates the use of a unified access control server 400 to control various discrete physical access and network access policies 402 and 406 and lists 404 and 408. A unified policy engine 410, which is a part of unified access control server 400, acts as the point of unification for lists and policies that tie physical access policies and events to network policies and events. Unified policy engine 410 and unified access control server 400 may also provide pre-defined default policies when physical access lists or policies do not logically agree with network access control lists and policies. Engine 400 generates and transmits policy-based instructions to physical security system 200 as well as frame/packet network 204 in response to an event or combination of events to facility access or network connected devices such that the access control and network connected devices perform the specified action. Engine 400 logs all attempts to access a physical facility or a network resource and implements policy-based instructions in response to each or any access attempt. Engine 400 may communicate with a separate management station for monitoring network resources and access control events throughout the system, even if the system spans multiple facilities and multiple networks.

It should be noted that the lists of credentials and policies can, in some embodiments, reside and be integrated into but not limited strictly to network infrastructure devices such as routers, switches and access points as well as multi-purpose servers.

Engine 410 can implement policies that associate physical resource access requests or events with network-based resource access requests or events from a given entity or group of entities that are implemented, arbitrated and provide response instructions on a unified physical access and network access control server or similar platform. These policies correlate and specify events in the physical realm that can be tied to events or access of network resources and vice versa. Policies that associate physical resource access requests or events with network-based resource access requests or events from a given entity or group of entities may be implemented, arbitrated and responsive instructions provided on a unified physical access and network access policy server or similar platform.

Note that the present invention enables a common list and/or table or synchronized set of lists/tables containing authorized entities, defined by credentials (identity establishment via password, fingerprint, badge, etc.), permitted to access a physical or network facility/resource based upon a specified set of conditions (policies). A synchronized set of lists and/or tables containing authorized entities, defined by credentials (identity establishment via password, fingerprint, badge, etc.), permitted to access a physical or network facility/resource based upon a specified set of conditions (policies) as well as instructions upon authorization to modify other specified physical resource parameters such as but not limited to lighting, heating and cooling, and the like. Alternatively, a distributed common set of lists and/or tables containing authorized entities, defined by credentials (identity establishment via password, fingerprint, badge, etc.), permitted to access a physical or network facility/resource based upon a specified set of conditions (policies) as well as instructions upon authorization to modify other specified physical resource parameters such as but not limited to lighting, heating and cooling, and the like.

Server 400 with policy engine 410 further includes the capability for ingesting, maintaining and distributing access control policies (e.g., the list) for access to physical and/or network facilities/resources via connection to and communication over a frame and/or packet-based network. It also includes the capability for receiving and/or detecting an access-request or event-request from either or both physical and network-based resources, requiring credential verification and policy determination. Further still, server 400 with its policy engine 410 includes the capability for implementing, enforcing and executing physical and/or network access control policies (policy enforcer) which generates and transmits policy-based responses based upon a given event(s) to other devices for a corresponding, pre-defined action. Authorized personnel may create credentials and policies, configure access control system devices and manage access control systems at a secure management station and these capabilities may be programmed in appropriate computer software code, tables and lists and executed at the server 400.

Although the invention has been described with respect to specific embodiments thereof, these embodiments are merely illustrative, and not restrictive of the invention. In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

In general, the functions of the present invention can be achieved by any means as is known in the art. It will be appreciated that the unified access control server may be a stand-alone server or other computing devices or an engine resident on a shared platform such as a server or network infrastructure device. It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An access control system comprising:
a plurality of devices capable of receiving credentials for access requests, the plurality of devices comprising a physical facility device for providing access to a physical facility and a network resource device for providing access to a network resource, the physical facility device configured to receive a first access request with a credential for access to the physical facility and the network resource device configure to receive an access request with a credential for access to the network resource where the physical facility device and network resource device defer validating of the credentials and generate and send access requests including the credentials; and
a server configured to receive the access requests including the credentials and having access to a list containing authorized entities, defined by credentials, permitted to access the physical facility and the network resource based upon a certain specified criteria or policy; said server configured to verify credentials submitted by both the physical facility device and the network resource device and issue commands to distribute and implement said policies using the physical facility device and the network resource device, the server configured to be an initial verifier of credentials received in the access requests received from both the physical facility device for accessing the physical facility and the network resource device for accessing the network resource,
wherein the physical facility device receives a command from the server regarding credential verification of the credential sent in the access request and enforces access based on the command, the server being the initial verifier of the credential to enforce access at the physical facility device,
wherein the network resource device receives a command from the server regarding credential verification of the credential sent in the access request and enforces access based on the command, the server being the initial verifier of the credential to enforce access at the network resource device.

2. The access control system of claim 1 wherein said list is a synchronized set of lists.

3. The access control system of claim 1 wherein said list is a distributed common set of lists.

4. The access control system of claim 1 wherein said devices comprise physical access control, network-connected or both physical access control and network-connected and wherein said list further containing policy for issuing instructions to modify physical resource parameters and network access parameters.

5. The access control system of claim 4 wherein said physical resource parameters include lighting, heating and cooling.

6. The access control system of claim 4 wherein said server further generates and transmits policy-based instructions in response to an event or combination of events to said network connected devices such that said network connected devices perform a corresponding, pre-defined action.

7. The access control system of claim 1 wherein said server comprises means for ingesting, maintaining and distributing access control policies for access to physical facilities and to network resources.

8. The access control system of claim 1 further comprising a frame based network.

9. The access control system of claim 1 further comprising a packet-based network.

10. The access control system of claim 1 further comprising a unified sewer and management station for logging attempts to access a physical facility and a network resource.

11. The access control system of claim 10 further comprising means for logging policy-based instructions in response to each access attempt.

12. The access control system of claim 10 further comprising means for monitoring network resources and access control events.

13. The access control system of claim 10 further comprising means for implementing an access policy for regulating user access to multiple facilities and multiple networks.

14. The access control system of claim 1 wherein said list and policies are integrated into a network infrastructure device.

15. A method for implementing access control policies for physical facilities and network resources at server, the method comprising:

defining policies for an entity or a group of entities;

receiving a first credential verification request for a physical resource access request from a physical resource device, the first credential verification request including first credentials, wherein the first credential request defers validating of the first credentials to the server from the physical facility device;

receiving a second credential verification request for a network-based resource access request from a network-based resource device, the second credential verification request including second credentials, wherein the second credential request defers validating of the second credentials to the server from the physical facility device;

verifying, at the server, the first credential verification request based on a policy in said policies, the verifying by the server being an initial verifier of the first credentials;

verifying, at the server, the second credential verification request based on a policy in said policies, the verifying by the server being an initial verifier of the second credentials;

sending a first response to the first credential verification request to the physical resource device based on the verification of the first credential verification request, wherein the first response allows the physical resource device to enforce access based on the first response; and sending a second response to the second credential verification request to the network-based resource device based on the verification of the second credential verification requests, wherein the second response allows the network-based resource device to enforce access based on the second response.

16. The method of claim 15 wherein said policies are defined by correlating and specifying events in the physical realm with events or access of network resources.

17. The method of claim 15 further comprising: associating physical resource access requests or events with network-based resource access requests or events from a given entity or group of entities.

18. The method of claim 17 further comprising: correlating and specifying access to said network resources with events in the physical realm.

19. A method of managing access to physical and network-based assets at a server, the method comprising:

provisioning a unified list with user credentials that define access fights to physical facilities and network resources, said unified list farther including user information that defines access rights to network resources and physical facilities;

managing, at a server, access to physical and network-based assets from a common platform, wherein the common platform verifies user credentials for access to the physical facilities and network resources, the server being an initial verifier of user credentials in access requests received from the physical facilities and network resources; and sending verification responses to the physical facilities and network resources based on the server verifications to allow the physical facilities and the network resources to enforce access, the physical facilities and network resources deferring verification of the user credentials to the server.

20. An apparatus configured to implement access control policies for physical facilities and network resources, the apparatus comprising:

one or more processors; and logic encoded in one or more tangible media for execution by the one or more processors and when executed operable to:

define policies for an entity or a group of entities; receive a first credential verification request for a physical resource access request from a physical resource device, the first credential verification request including first credentials, wherein the first credential request defers validating of the first credentials to the apparatus from the physical facility device;

receive a second credential verification request for a network-based resource access request from a network-based resource device, the second credential verification request including second credentials, wherein the second credential request defers validating of the second credentials to the apparatus from the physical facility device;

verify the first credential verification request based on a policy in said policies, the verification by the apparatus being an initial verifier of the first credentials;

verify the second credential verification request based on a policy in said policies, the verification by the apparatus being an initial verifier of the second credentials;

send a first response to the first credential verification request to the physical resource device based on the verification of the first credential verification request, wherein the first response allows the physical resource device to enforce access based on the first response; and send a second response to the second credential verification request to the network-based resource device based on the verification of the second credential verification request, wherein the second response allows the network-base resource device to enforce access based on the second response.

* * * * *